Sept. 3, 1963　　L. D. SNEARY ET AL　　3,102,865
METHOD FOR FOAMING A CRYSTALLINE OLEFIN POLYMER
CONTAINING A BLOWING AGENT AND A HEAT SINK
Filed April 8, 1960
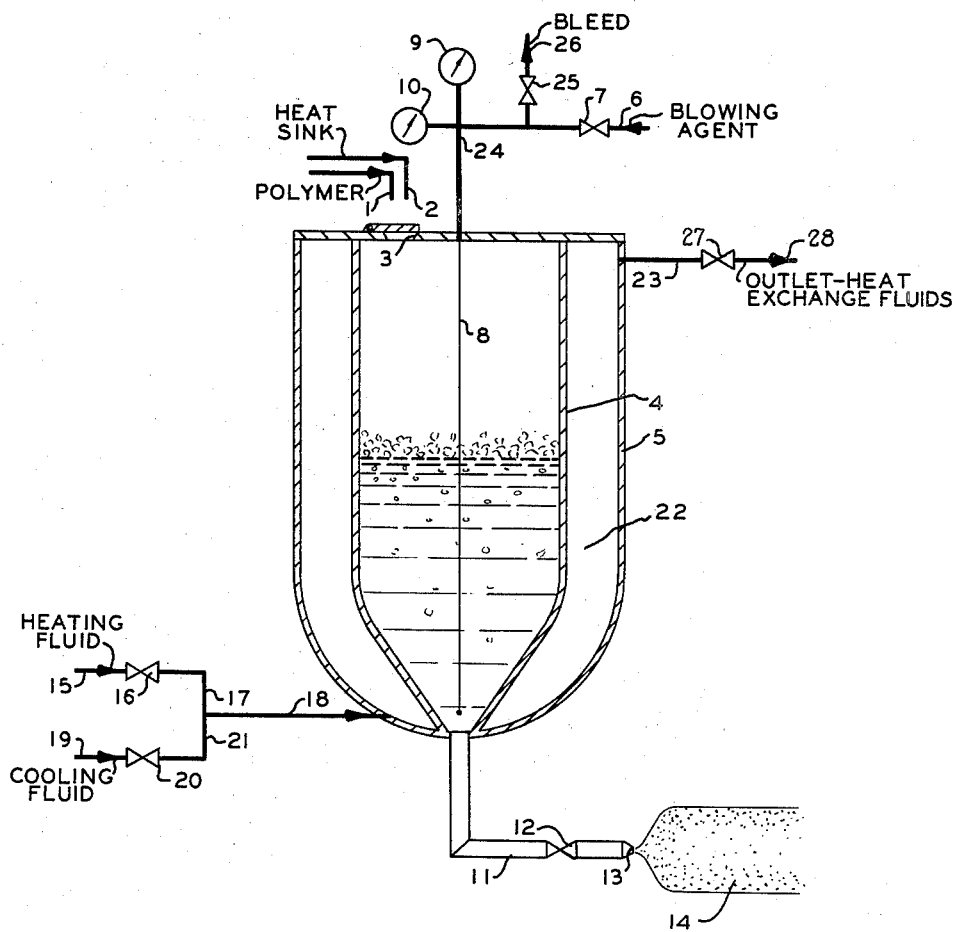
INVENTORS
L.D. SNEARY
J.E. PRITCHARD
BY
Hudson and Young
ATTORNEYS

United States Patent Office 3,102,865
Patented Sept. 3, 1963

3,102,865
METHOD FOR FOAMING A CRYSTALLINE OLEFIN POLYMER CONTAINING A BLOWING AGENT AND A HEAT SINK
Loy D. Sneary and James E. Pritchard, Bartlesville, Okla., assignors to Phillips Petroleum Company, a corporation of Delaware
Filed Apr. 8, 1960, Ser. No. 20,895
14 Claims. (Cl. 260—2.5)

This invention relates to foamed thermoplastic materials. In another aspect, this invention relates to the foaming of highly crystalline, thermoplastic polymers.

Materials having a more or less uniform cellular structure have found use in such things as insulation. Such cellular materials have been prepared in a variety of ways and from a variety of starting materials. Among the more common foamed materials are polyurethanes, polystyrenes, cellulose esters, polyvinyl chloride, polyvinylidene chloride, and the like.

In one method of producing a cellular structure the thermoplastic material is dissolved in a solvent thereby producing a viscous solution into which is incorporated a third, solid component which decomposes upon the application of heat or chemical treatment to yield a gas. After treating the mass so as to decompose the gas-generating-solid, hollow spaces are formed throughout the material resulting in a permanent porous or cellular structure. In another method the thermoplastic material has incorporated therein a soluble inorganic salt of finite size which is subsequently extracted by means of a preferential solvent, such as water, thereby leaving behind a porous or cellular mass. In another method the molten thermoplastic material is thoroughly mixed with a gas or a liquid which is volatile at normal atmospheric pressure, and the mixture is then subjected to elevated temperature and pressure in a closed chamber. The material is then released from the closed chamber through a suitable die or opening thereby releasing the pressure and causing the gas to expand resulting in a permanent porous or cellular portion upon cooling.

Each of the above methods has its advantages and disadvantages; however, it has been found in certain instances and with certain polymers that the above described methods are not satisfactory for pore size or pore distribution, or for polymers adversely affected by the residuum materials. In addition, some of the highly crystalline polymers have such a high heat of crystallization that it is difficult to remove the released thermal energy which remains entrapped within the polymer and keeps the polymer in a molten state until after the expanding gas has escaped thereby forming a poor cellular structure.

We have found a method whereby thermoplastic materials may be foamed into a uniform cellular structure by incorporating therein a blowing agent and a heat sink.

It is an object of this invention to provide an improved method for foaming thermoplastic materials. It is another object of this invention to provide an improved method of gas foaming highly crystalline thermoplastic polymers.

It is another object of this invention to provide an improved method of gas foaming a high density, highly-crystalline polyethylene.

Other objects, features and advantages of this invention will be obvious to those skilled in the art from the following detailed description and discussion.

By the method of this invention thermoplastic materials are foamed by incorporating therein a mixture of a blowing agent and a heat sink, heating said mixture under conditions of applied heat and pressure to melt said polymer and produce a uniform dispersion, discharging said mixture through a pressure reduction zone wherein the blowing agent expands the polymer with the polymer solidifying and thereby releasing thermal energy which is absorbed by the blowing agent and the heat sink.

In general, any normally solid polymer of a thermoplastic material can be used within the scope of this invention. More particularly any solid thermoplastic material having a heat of crystallization sufficiently high to prevent complete absorption by the blowing agent or loss by conduction, etc. of the thermal energy released upon solidification may use this invention. Many thermoplastic polymers are noncrystalline in nature so that when a blowing agent is incorporated therewith for the purpose of foaming said polymer and the polymer mass is then heated above its melting point and subsequently cooled, the blowing agent is able to absorb all of the released thermal energy without the necessity of adding a third component. However, it has been found that with high-density and highly-crystalline polymers such as the polyethylenes made by the method of Hogan and Banks Patent No. 2,825,821, issued March 4, 1958, the heat of crystallization is sufficiently high so that no known blowing agent in quantity considered desirable for a satisfactory product is able to absorb all of the released energy. When using such a polymer it becomes desirable to provide some means of removing the excessive heat so as to permit the polymer to solidify while the gas is still in an expanded state, thereby entrapping the gas and producing a cellular structure.

Thermoplastic materials having a highly crystalline structure are becoming more and more desirable for fabricating foamed articles. These materials are produced by a variety of methods and it is not essential to this invention that the thermoplastic material be produced in any particular manner. Thermoplastic materials having crystallinities in the range 5 to 100 percent, more particularly, 40 to 100 percent, can benefit from this invention. A highly satisfactory and often preferred, highly crystalline olefin polymer can be obtained by the process set forth in the patent of Hogan and Banks, No. 2,825,721, issued March 4, 1958. According to that patent, polymers are produced by polymerizing 1-olefins having a maximum chain length of 8 carbon atoms per molecule and no branching nearer the double bond than the 4-position by contacting with a solid catalyst containing, as an essential catalytic ingredient, chromium oxide associated with at least one porous oxide selected from the group consisting of silica, alumina, zirconia, and thoria. Liquid phase or vapor phase operation can be employed. Polyethylene produced by such a process will ordinarily have a molecular weight in the range of 35,000 to 280,000 or higher, a density in the range 0.940 to 0.990, e.g., approximately 0.960, and a crystallinity in the range 90 to 95 percent. The tensile strength of the polymer, as produced, will ordinarily be of the order of 4000 to 5000 p.s.i. but can be higher or lower.

Density as used herein is determined by compression molding a slab of the polymer, cooling said molding at a temperature reduction rate of 15 to 20° F. per minute to room temperature, cutting a pea-sized specimen therefrom, and placing said specimen in a 50-ml., glass-stoppered graduate. Carbon tetrachloride and methyl cyclohexane are added to the graduate from burettes in proportion such that the specimen is suspended in the solution. During the addition of the liquids, the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73 to 78° F., the balance is adjusted until the pointer is at zero. The value shown on the scale is taken as the density in gms./cc.

The polymer crystallinities were determined according to the following procedure: Two grams of polymer are placed in a one-inch mold having aluminum foil discs covering each mold face. The sample is pressed cold to about 2000 p.s.i. and heated to 170 to 180° C., following which the pressure is increased to 5000 p.s.i. and maintained at this level for about 5 minutes at the same temperature. This sample is then cooled to 50 to 60° C. at a rate of about 4° C. per minute (in the temperature range of 150 to 120° C.). Following this, the sample is cooled with air blast to room temperature after which it is removed from the mold and trimmed, if necessary, to provide one flat face. The same is then placed in a rotating specimen holder of a North American Philips diffractometer and examined with a copper target X-ray tube operated at 40 kv. peak and 18 ma. using ½ degree divergent slits, 0.006 inch collecting slit, and nickel foil filter. The scintillation counter, X-ray detector, linear amplifier and pulse height analyzer are used with proper settings so that the system passes 90 percent of the counts due to K alpha radiation that would be passed in the absence of the analyzer. A time constant of 8 seconds is used and scale factors are selected so that the most intense peak of the pattern remains on the chart. The sample is scanned from 12 degrees two theta to 28 degrees two theta using a scanning speed of ½ degree two theta per minute and a chart speed of ½ inch per minute. At the beginning of each run, the signal level existing with the X-ray beam shutter closed is recorded. To utilize the X-ray record a straight background line is drawn from the point on the curve at 15.4 degrees two theta to the point on the curve at 25.5 degrees two theta. From the point on the curve at 19.7 degrees two theta a straight line is drawn to the point on the curve at 17.7 degrees two theta and from there to the point at 15.4 degrees two theta. The height above the background of the point at 17.7 degrees two theta is measured and a point is marked at this same height above the background at 21.7 degrees two theta, then straight lines are drawn from this point to the peak of the amorphous band at 19.7 degrees two theta and to the point of the background line at 24.0 degrees two theta. These lines give the contribution of the amorphous band to the intensity in the region of the crystalline peaks. The area of the amorphous band in square centimeters is obtained from the formula $$5.1a - 10.9b$$

where $a$ and $b$ are the heights of the curve above background at 19.7 degrees and 17.7 degrees two theta, respectively, measured in centimeters. The 110 crystalline peak is resolved by drawing in the high angle sides so that it meets the amorphous line at about 23.0 degrees two theta. The area of the 110 and 200 crystalline peaks in square centimeters is measured using a metric planimeter. The percent crystallinity is then computed from the formula $$\frac{I_{110} - 1.45 I_{200} - 0.73 I_A}{I_{110} - 1.45 I_{200}} \times 100$$

where $I_{110}$, $I_{200}$, and $I_A$ are the areas of the 110 peak, 200 peak and amorphous band, respectively.

The latent heat of crystallization may be defined as the latent heat accompanying the precipitation of crystals from a saturated solution. In the case of polymers of thermoplastic materials this is normally an exothermic change and occurs at the freeze point. The crystalline freeze point determination is carried out by melting a sample of the polymer, inserting a thermocouple into the molten polymer and allowing the molten polymer to cool slowly. The temperature is recorded and is plotted on a chart versus time. The crystalline freeze point is the first plateau in the curve. Amorphous materials, such as polystyrene, do not exhibit this characteristic of a plateau in the cooling curve which is indicative of the formation of a crystalline solid and do not, therefore, release this latent heat of crystallization upon cooling.

The concept of molecular weight is fully discussed in Hogan and Banks Patent No. 2,825,721, issued March 4, 1958. Unless otherwise specified, the term "molecular weight" as used herein means molecular weight based on inherent viscosity using the Staudinger equation (molecular weight=$2.445 \times 10^4 \times$ inherent viscosity).

The tensile strength and the elongation were determined by ASTM method D-638-52T except the compression molded specimens correspond to ASTM method D-412-49T, type C.

For melt index, the method of ASTM D-1238-52T is used with five runs being run at 2-minute intervals, averaging the five weights, discarding any values which deviate from the average by more than 5 weight percent, re-averaging and multiplying by .5 to obtain the amount of extrudate in 10 minutes. If the melt index is low, such as less than 1.0, the high load melt index may be obtained by ASTM D-1238-57T (procedure 5) using a weight of 21,600 grams.

Any conventional blowing agent used for foaming of thermoplastic materials may be used in this invention providing it is not detrimental to the polymer at the elevated conditions of temperature and pressure, is inert to the heat sink and is gaseous at the temperature of solidification of the polymer. Blowing agents which decompose at the elevated conditions of temperature and pressure, thereby producing a gaseous expanding medium, may also be utilized but are not preferred. Suitable materials will include nitrogen, methyl chloride, $CO_2$, Freon 12 ($CCl_2F_2$), Freon 114 ($CClF_2CClF_2$), butane, propane, halogenated alkanes, acetone, chloroform, methylene dichloride, and the like. Preferred blowing agents would include butane and propane for their low cost and agents such as Freon 12 for its low conductivity factor. The amount of the blowing agent to be used may vary from as little as one percent to as much as 300 percent based on polymer weight but it would generally be preferred to use an amount in the range of 10 percent to 75 percent. More preferably the range will be from 10 percent to 35 percent.

The third component in the system which we will call a thermal energy receiver or heat sink may be any material not detrimental to the polymer either during the foaming thereof or during the utilization of the polymer foam but will be limited by the following factors: (1) it must have a critical temperature considerably above the operation condition temperature, (2) it must have a sufficiently high latent heat of vaporization to be able to absorb the excess energy given off by the polymer during solidification, and not absorbed by the blowing agent, and (3) it must have a degree of semicompatibility at the operating conditions. It is not necessary that this third component be completely soluble in or a solvent for the polymer but it is sufficient if there is no phase separation during the heating step. It must simply be well dispersed in the polymer. It should also be a non-solvent at room temperature. From 1 to 40 weight percent heat sink based on total weight may be used, more preferably 8 to 25 weight percent. For high-density, highly-crystalline polyethylene such as that made by the method of Hogan and Banks, it has been found that the higher alcohols such as ethanol, propanol, butanol, and pentanol or their isomers are satisfactory. More preferably, normal propanol and normal butanol have the desired compatibility and heat of vaporization. It has been found that with materials such as high-density polyethylene the compatibility of materials such as alcohols varies directly with the number of carbon atoms in the alcohol. However, since the latent heat of vaporization of the alcohol is apparently some function of the ratio of oxygen bonds to carbon bonds, the higher the ratio of carbon atoms to OH groups the lower the latent heat of vaporization. Therefore, a balance must be maintained between the latent heat of vaporization and the compatibility of the heat sink with the polymer. Other compounds that may be utilized include ketones, aldehydes, esters and the like so long as they comply with the above three factors. It has been found that materials such as water are incompatible with high-density polyethylene even in the melt stage and therefore are unsatisfactory even though the latent heat of vaporization is high.

Any suitable means may be used to provide uniform dispersion of the blowing agent and heat sink in the polymer so the system may be maintained under adequate pressure at the temperatures being employed. The operation may be either continuous or batch. It is preferred that the temperature and pressure in the mixer should be sufficiently high to insure liquidity of the components at the operating conditions but this need not be. In general, the operating temperature should exceed the melting point of the polymer but should not exceed the decomposition point of the polymer. More preferably a temperature of 25 to 250° F. above the melting point will decrease the amount of time necessary to melt the polymer without the corresponding detrimental effects of prolonged heating, such as oxidation. For high-density, high crystalline polyethylene having a melting point of 260° F. a temperature range of 265 to 600° F. will be satisfactory, more preferably a range of 350 to 550° F.

The pressure under which the composition should be mixed need be only sufficiently high to produce a satisfactory pressure differential between the mix conditions and the normal atmospheric pressure so that the polymer will be expanded to the desired density upon release of the pressure. For high-density, highly-crystalline polyethylene this will mean a range of 200 to 20,000 p.s.i.a., more preferably 200 to 1200 p.s.i.a.

The mixture may be cooled in the same vessel in which it was mixed, such as a lengthened extruder, or a separate unit may be added, or a plurality of units may be added, so long as the temperature is decreased to a temperature slightly above the crystallization temperature of the polymer. A temperature of 1 to 75° F. above the crystallization temperature is preferred. More preferably, the temperature should be 10 to 40° F. above the crystallization temperature. This process or step is not essential but is normally considered advisable so that the heat load on the heat sink and the blowing agent will be decreased, thereby making it possible to use a minimum amount of the heat sink. The final temperature should be only slightly above the melting point of the polymer but should be sufficiently high to prevent "plating out" of the polymer on the walls of the equipment. A satisfactory means includes a lengthened extruder wherein the polymer is mixed in one end, temperature and pressure are developed in the middle and an opportunity for the polymer to cool slightly is provided by the length of the extruder. A heat exchanger system may be used but this often presents a problem of finding adequate means to transfer the heat of a cooling polymer which normally has a high viscosity at these temperatures and an inherently low thermal-conductivity coefficient. It is satisfactory to cool high-density, highly-crystalline polyethylene having a freeze point of approximately 252° F. to a temperature of 255 to 300° F. prior to expansion, more preferably 255 to 275° F.

Once the polymer has been completely mixed and dispersed with the blowing agent and the heat sink, the temperature and pressure elevated and subsequently cooled to a point slightly above the melting point of the polymer, the polymer may then be extruded or expanded by any suitable conventional means, such as a nozzle, or an orifice, or a slot die.

The amount of heat that will then be necessary to be removed from the polymer mixture will be the sensible heat to reduce the temperature from slightly above the melting point of the polymer to a temperature slightly below the melting point of the polymer, as well as the latent heat of fusion or latent heat of crystallization of the polymer. Many of the materials normally foamed by means heretofore available are non-crystalline in nature and consequently have a relatively small amount of heat to be removed. This small amount of released heat can be absorbed by the blowing agent itself. However, a material which has a high heat of crystallization, for instance, high-density, highly-crystalline polyethylene, which has a latent heat of crystallization of approximately 45 B.t.u. per pound, will not have its entire released thermal energy removed by the normal blowing agent and part of the polymer will thus remain in a molten state until the gas escapes thereby producing an inferior foamed material. By the incorporation of the heat sink it is possible to obtain either a unicellular product or a honeycomb depending on the proportions of blowing agents, the viscosity of the polymer, the rate of expansion, whether a closed mold or open mold is used, etc.

Expansion for materials of this type may be very great, for instance the expansion of high-density, highly-crystalline polyethylene will be from about 60 lbs./cubic foot to a foam of roughly one pound/cubic foot.

A usable density for a good foam may vary from as little as 0.5 pound/cubic foot to 30 or more pounds/cubic foot depending upon the ultimate use thereof. In addition to being able to produce a low-density foam by the method of this invention, foam produced from high-density polyethylene has exceptionally high tear strength and exceptional low temperature toughness.

This invention will be further described in conjunction with the drawing attached hereto. Although this description will have reference to a particularly simplified apparatus for the utilization of this invention and will further be simplified as to the particular ingredients used, the invention should in no way be considered limited thereby.

As shown in the drawing the polymer, such as polyethylene, and the heat sink, such as propanol, are introduced by way of conduits 1 and 2 respectively through a port 3 into a pressure container 4 which can be completely closed so as to maintain the desired elevated pressure and temperature. The pressure container or kettle is surrounded by a jacket 5 so as to form an annular space 22 between the jacket and the kettle for the introduction of a heat exchange fluid through conduit 18 and the removal of same through conduit 23. The blowing agent, such as Freon 114, is introduced through conduit 6, valve 7 and conduit 24 into the pressure kettle 4. A thermocouple 8 is submerged in the dispersion in the kettle to indicate the temperature thereof by means of temperature gauge 9. By means of pressure gauge 10, the pressure developed in the pressure kettle 4 by means of the introduction of the blowing agent, the vaporization of the heat sink and the expansion of the gases within the kettle is indicated. When the proper proportions of the components have been introduced into the pressure kettle 4, port 3 is closed to form a pressure type seal, quick opening valve 12 is closed and valve 25 is operated to bleed off a sufficient amount of the expanded gases to maintain the indicated pressure within the kettle at the desired level. The heating fluid, such as superheated steam, is introduced through conduit 15, valve 16 and conduits 17 and 18 into the annular space 22 so as to elevate the temperature of the components in the pressure kettle 4. The heating fluid is withdrawn through conduit 23, valve 17 and conduit 18 at a rate sufficient to maintain said desired temperature and pressure. When the temperature of the components has reached the desired level the components are allowed to soak for a period of time sufficient to insure complete dispersion. An agitator may be provided within pressure kettle 4 to insure adequate dispersion and to decrease the time element. At the termination of the soaking period, valve 16 is closed and valve 20 is opened to permit the introduction of a cooling fluid, such as water.

through conduit 19, valve 20, conduit 21 and conduit 18 into annular space 22. Withdrawal of the cooling fluid is effected through conduit 23, valve 27 and conduit 28. This cooling fluid is introduced for a period of time sufficient to reduce the temperature of the components, as measured by temperature gauge 9, to a point slightly above the freezing point of the polymer. When this temperature has been attained, quick opening valve 12 is opened and the dispersion is allowed to escape through an orifice 13 of the desired configuration into a zone of atmospheric pressure so as to form the desired foam 14.

Many modifications of apparatus may be utilized to form a satisfactory foam by means of applicants' invention. A particularly desirable method of providing the required malaxation, the desired temperatures and pressures and the required extrusion is possible by masticating the material with equipment employing rotating screws with flights of varying pitch and opposite pitch so that high pressures and temperatures are developed within the material by internal friction. In equipment of this type dispersion of the 3 components is readily achieved and following the severe mastication the developed pressure is suddenly reduced by permitting the material to escape through an orifice or die of the desired configuration. Equipment of this type, called an extrusion drier, is manufactured by Welding Engineers Incorporated, Morristown, Pennsylvania, and is fully described in the reissued patent of L. J. Fuller, Re. 23,948, reissued February 15, 1955. Suitable modifications of this apparatus can be made to incorporate the advantages of applicants' invention. In particular it is desirable to provide a means for the introduction of the normally gaseous blowing agent into the feed section of the screws prior to the compounding section. Any suitable method of achieving this is satisfactory.

As discussed hereinafter in Example 2, the extrusion drier described above may be used in conjunction with a cooler-mixer to provide a separate means of cooling the dispersion prior to expansion through an orifice.

*Example I*

A polyethylene prepared in cyclohexane solvent and in the presence of a chromium oxide catalyst according to the method of Hogan and Banks, supra, having a crystallinity of over 90 percent at room temperature, a density of about 0.960 and a melt index of about 0.5 was placed in a pressure vessel along with a blowing agent and a heat sink in accordance with the following formula: 73.5 weight parts polyethylene, 150 weight parts Freon 114, and 18 weight parts normal propanol. The vessel was closed and heated by means of a heating coil to a temperature of 600° F., soaked for a total of 45 minutes, cooled to 275° F. by circulating a cooling fluid through the coil, and then released through a quick opening valve to form an expanded polyethylene foam. The foam was a low-density, tough, cellular material and when cut into slabs was found to be uniformly cellular.

*Example II*

Polyethylene produced by the method described in Example I is introduced into an extruder along with the blowing agent and the alcohol in accordance with the following formula: 60 weight parts polyethylene, 25 weight parts Freon 114, and 15 weight parts normal propanol. The mixture is completely dispersed in the extruder and the extruder develops pressures and temperatures of approximately 500° F. at approximately 1200 p.s.i.a. The mixture is then discharged into a cooler-mixer operating at elevated temperatures and pressures wherein the mixture is cooled by means of cooling coils with agitation to approximately 270° F. The mixture is then expanded through a slot-die to atmospheric pressure emerging at an initial temperature of approximately 240° F. A tough, uniformly cellular, foamed polyethylene is obtained having a density of 1.85 pounds/cubic foot.

*Example III*

The method of Example II is used but the formula contains the following: 70 weight parts polyethylene such as described in Example I, 16 weight parts normal butane, and 14 weight parts normal propanol. A uniform cellular material having a final density at room temperature of approximately 1.0 pound/cubic foot is obtained.

*Example IV*

The following formula is introduced into an extruder such as used in Example II: 74 weight parts polyethylene such as described in Example I, 7 weight parts isobutane, and 19 weight parts normal propanol. The extruder produces pressures of 690 p.s.i.a. at approximately 450° F. wherein the mixture is completely dispersed. The end of the extruder near the expansion die is provided with cooling jackets and the length of the extruder is such that the mixture upon dispersion travels a length after mixing so as to cool the mixture to approximately 270° F. prior to expansion through a slot die to form a tough polyethylene foam having a density of 2.2 pounds/cubic foot.

*Example V*

The method of Example IV is used in accordance with the following formulation: 70 weight parts polyethylene such as described in Example I, 15 weight parts normal butane, and 15 weight parts normal butanol. A uniform cellular material having a final density at room temperature of approximately 1.05 pounds/cubic foot is obtained.

*Example VI*

A crystalline polypropylene is prepared with a catalyst system of titanium trichloride and triisobutyl aluminum in accordance with the method of W. B. Reynolds et al., Patent No. 2,886,561, issued May 12, 1959, and has a density of about 0.900 and a freeze point of about 251° F. This polypropylene is introduced into an extruder along with the blowing agent and the heat sink in accordance with the following formulation: 70 weight parts polypropylene, 10 weight parts normal butane and 20 weight parts tertiary amyl alcohol. The mixture is treated in the method of Example IV to form a tough polypropylene foam having a density at room temperature of about 2.2 pounds/cubic foot.

While certain examples, structures, compositions and process steps have been described for purposes of illustration, the invention is not limited to these. Variation and modification within the scope of the disclosure and the claims can readily be effected by those skilled in the art.

What we claim is:

1. A method for foaming an olefin polymer having a crystallinity in the range of 5 to 100 percent into a uniformly cellular mass, said polyolefin having a heat of crystallization sufficiently high to prevent complete absorption of the released energy during expansion by the blowing agent and by conduction of the thermal energy released upon solidification and having been produced by polymerizing a 1-olefin having a maximum chain length of 8 carbon atoms per molecule, which comprises uniformly dispersing in said polymer a normally gaseous blowing agent and an inert heat sink which will evaporate during the cooling of said polymer and which has a sufficiently high latent heat of vaporization to be able to absorb at least a portion of the thermal energy released during the solidification of the polyolefin, said heat sink being selected from the group consisting of alkanols having from 2 to 5 carbon atoms per molecule, elevating the temperature of said dispersion to melt said polymer while subjecting said dispersion to superatmospheric pressure sufficiently high to prevent vaporization of the heat sink, suddenly releasing said pressure to permit the vaporization and expension of said normally gaseous blowing agent and said heat sink thereby expanding, cooling and solidifying said molten polymer to form a mass of low density foam, said heat sink and blowing agent being selected so as to absorb the thermal energy released due to sensible heat and heat of crystallization during the process of solidifying the polymer.

2. A method for foaming an olefin polymer having a crystallinity in the range of 5 to 100 percent into a uniformly cellular mass, said polyolefin having a heat of crystallization sufficiently high to prevent complete absorption of the released energy during expansion by the blowing agent and by conduction of the thermal energy released upon solidification and having been produced by polymerizing a 1-olefin having a maximum chain length of 8 carbon atoms per molecule, which comprises uniformly dispersing in said polyolefin a normally gaseous blowing agent and an inert heat sink which will evaporate during the cooling of said polymer and which has a sufficiently high latent heat of vaporization to be able to absorb at least a portion of the thermal energy released during the solidification of the polyolefin, said heat sink being selected from the group consisting of alkanols having from 2 to 5 carbon atoms per molecule, elevating the temperature of said dispersion to melt said thermoplastic material while subjecting said dispersion to superatmospheric pressure sufficiently high to prevent vaporization of the heat sink, cooling said dispersion to a temperature slightly above the freezing point of said polyolefin, suddenly releasing said pressure to permit the vaporization and expansion of said normally gaseous blowing agent and heat sink thereby expanding, cooling and solidifying said molten polyolefin to form a mass of low density polyolefin foam, said heat sink and blowing agent being selected so as to absorb the thermal energy released due to sensible heat and heat of crystallization during the process of solidifying the polymer and also being selected so as to expand the polymer to a density in the range of ½ to 30 lbs. per cubic foot.

3. A method for foaming a crystalline polyolefin having a crystallinity in the range of 40 to 100 percent into a uniformly cellular mass, said polyolefin having a heat of crystallization sufficiently high to prevent complete absorption of the released energy during expansion by the blowing agent and by conduction of the thermal energy released upon solidification and having been produced by polymerizing a 1-olefin having a maximum chain length of 8 carbon atoms per molecule, which comprises uniformly dispersing in said polyolefin from one to 300 weight percent of a normally gaseous blowing agent and a sufficient amount of an inert semi-compatible heat sink which will evaporate during the cooling of said polymer and which has a sufficiently high latent heat of vaporization to be able to absorb at least a portion of the thermal energy released by the polyolefin during solidification, said heat sink being selected from the group consisting of alkanols having from 2 to 5 carbon atoms per molecule, applying sufficient heat to uniformly elevate said dispersion to a temperature in the range of 25 to 250° F. above the melting point of said polyolefin while subjecting said dispersion to superatmospheric pressure sufficiently high to prevent vaporization of the heat sink and produce a pressure differential so that the polymer will be expanded to the desired density upon release of said pressure, cooling said dispersion to a temperature in the range of 1 to 75° F. above the freezing point of said polyolefin, suddenly releasing said pressure to permit vaporization and expansion of said normally gaseous blowing agent and said heat sink thereby expanding and cooling said molten polyolefin to form a mass of low density polyolefin foam, said heat sink and blowing agent being selected so as to absorb the thermal energy released due to sensible heat and heat of crystallization during the process of solidifying the polymer and also being selected so as to expand the polymer to a density in the range of ½ to 30 lbs. per cubic foot.

4. The method of claim 3 wherein said polyolefin is polyethylene having a density of 0.940 to 0.990 gm./cc. and a molecular weight of 35,000 to 280,000.

5. The method of claim 3 wherein said polyolefin is crystalline polypropylene.

6. The method of claim 3 wherein the amount of heat sink is 1 to 40 weight parts based on the total weight of the dispersion.

7. The method of claim 3 wherein said heat sink is normal propanol.

8. The method of claim 3 wherein said heat sink is normal butanol.

9. A method for foaming crystalline polyethylene having a crystallinity in the range of 40 to 100 percent and having a density of 0.940 to 0.990 gm./cc. into a uniformly cellular mass, said polyethylene having a heat of crystallization sufficiently high to prevent complete absorption of the released energy during expansion by the blowing agent and by conduction of the thermal energy released upon solidification, which comprises uniformly dispersing from 10 to 75 weight percent of a normally gaseous blowing agent and from 8 to 25 weight percent of a heat sink selected from the group consisting of alkanols containing from two to five carbon atoms to absorb at least part of the thermal energy released by said polyethylene during solidification, elevating the temperature of said dispersion to a range of 350 to 550° F. while subjecting said dispersion to a pressure in the range of 200 to 1200 p.s.i.a. and sufficiently high to prevent vaporization of the heat sink, cooling said dispersion to a temperature in the range of 255 to 275° F., suddenly releasing said pressure to permit vaporization and expansion of said normally gaseous blowing agent and heat sink thereby expanding, cooling and solidifying said molten polyethylene to form a mass of low density polyethylene foam, said heat sink and blowing agent being selected so as to absorb the thermal energy released due to sensible heat and heat of crystallization during the process of solidifying the polymer and also selected so as to expand the polymer to a density in the range of ½ to 30 lbs. per cubic foot.

10. The method of claim 9 wherein said heat sink is normal propanol.

11. The method of claim 9 wherein said blowing agent is selected from the group consisting of $CCl_2F_2$,

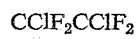

normal propane, normal butane and isobutane.

12. A method for foaming crystalline polypropylene into a uniformly cellular mass, said polypropylene having a heat of crystallization sufficiently high to prevent complete absorption of the released energy during expansion by the blowing agent and by conduction of the thermal energy released upon solidification, which comprises uniformly dispersing from 10 to 75 weight percent of a normally gaseous blowing agent and from 8 to 25 weight percent of a heat sink selected from the group consisting of alkanols containing from two to five carbon atoms to absorb at least part of the thermal energy released by said polypropylene during solidification, elevating the temperature of said dispersion to a range of 350 to 550° F. while subjecting said dispersion to a pressure in the range of 200 to 1200 p.s.i.a. and sufficiently high to prevent vaporization of the heat sink, cooling said dispersion to a temperature in the range of 255 to 275° F., suddenly releasing said pressure to permit vaporization and expansion of said normally gaseous blowing agent and heat sink thereby expanding, cooling and solidifying said molten polypropylene to form a mass of low density polypropylene foam, said heat sink and blowing agent being selected so as to absorb the thermal energy released due to sensible heat and heat of crystallization during the process of solidifying the polymer and also selected so as to expand the polymer to a density in the range of ½ to 30 lbs. per cubic foot.

13. The method of claim 12 wherein said heat sink is tertiary amyl alcohol.

14. The method of claim 13 wherein said blowing agent is selected from the group consisting of $CCl_2F_2$, $$CClF_2CClF_2$$

normal propane, normal butane and isobutane.

References Cited in the file of this patent

UNITED STATES PATENTS

| | | |
|---|---|---|
| 2,739,134 | Parry et al. | Mar. 20, 1956 |
| 2,831,820 | Aase et al. | Apr. 22, 1958 |
| 2,927,904 | Cooper | Mar. 8, 1960 |
| 2,945,828 | Henning | July 19, 1960 |
| 2,948,664 | Rubens | Aug. 9, 1960 |